US005931771A

United States Patent [19]

Kozyuk

[11] Patent Number: 5,931,771

[45] Date of Patent: Aug. 3, 1999

[54] METHOD AND APPARATUS FOR PRODUCING ULTRA-THIN EMULSIONS AND DISPERSIONS

[76] Inventor: Oleg V. Kozyuk, 14600 Brookpark Rd., Cleveland, Ohio 44135

[21] Appl. No.: 08/998,250

[22] Filed: Dec. 24, 1997

[51] Int. Cl.[6] .............................. B01J 13/00; B01F 5/08; B02C 19/00

[52] U.S. Cl. ............................ 516/53; 241/5; 366/176.1; 516/79

[58] Field of Search ......................... 252/314; 366/176.1, 366/177.1, 348; 516/53, 79; 241/5

[56] References Cited

U.S. PATENT DOCUMENTS

| | | | |
|---|---|---|---|
| 513,318 | 1/1894 | Grimm . | |
| 830,338 | 9/1906 | Ledoux . | |
| 1,027,101 | 5/1912 | Edwards . | |
| 1,496,858 | 6/1924 | Knollenberg | 252/314 |
| 1,627,161 | 5/1927 | Edwards | 48/189.4 |
| 1,892,906 | 1/1933 | Schnitter . | |
| 2,548,759 | 4/1951 | Allen | 23/288 |
| 2,882,025 | 4/1959 | Loo | 366/176.1 X |
| 3,049,574 | 8/1962 | Johnson | 585/380 |
| 3,081,257 | 3/1963 | Johnson et al. | 208/133 |
| 3,170,863 | 2/1965 | Spillane et al. | 208/3 |
| 3,467,072 | 9/1969 | Toesca | 123/590 |
| 3,546,129 | 12/1970 | Berg et al. | 252/314 X |
| 3,834,982 | 9/1974 | Alexandrovich et al. | 162/1 |
| 3,937,445 | 2/1976 | Agosta | 366/341 |
| 3,942,765 | 3/1976 | Henrickson | 366/336 |
| 3,988,329 | 10/1976 | Zucker | 260/409 |
| 4,127,332 | 11/1978 | Thiruvengadam et al. | 366/176.1 X |
| 4,145,520 | 3/1979 | Feltgen et al. . | |
| 4,164,375 | 8/1979 | Allen | 366/337 |
| 4,316,673 | 2/1982 | Speer | 366/337 |
| 4,344,752 | 8/1982 | Gallagher, Jr. | 431/354 |
| 4,464,057 | 8/1984 | Darrieu et al. | 366/139 |
| 4,498,786 | 2/1985 | Ruscheweyh | 366/336 |
| 4,506,991 | 3/1985 | Hudson | 366/341 |
| 4,619,406 | 10/1986 | Fishgal | 252/314 X |
| 4,674,888 | 6/1987 | Carlson | 366/337 |
| 4,893,275 | 1/1990 | Tanaka et al. | 365/189.9 |
| 4,908,154 | 3/1990 | Cook et al. | 252/314 |
| 4,915,135 | 4/1990 | Kellenbarger et al. | 138/44 |
| 4,929,088 | 5/1990 | Smith | 366/337 |
| 5,030,789 | 7/1991 | Dang Vu et al. | 585/503 |
| 5,085,058 | 2/1992 | Aaron et al. | 62/324 |
| 5,145,256 | 9/1992 | Wiemers et al. | 366/336 |
| 5,179,297 | 1/1993 | Hsueh et al. | 307/296.6 |
| 5,264,645 | 11/1993 | Hugues et al. | 585/640 |
| 5,300,216 | 4/1994 | Hertzberg et al. | 208/130 |
| 5,341,848 | 8/1994 | Laws | 138/44 |
| 5,413,145 | 5/1995 | Rhyne et al. | 138/44 |
| 5,492,654 | 2/1996 | Kozjuk et al. | 261/76 |
| 5,495,872 | 3/1996 | Gallagher et al. | 138/44 |
| 5,720,551 | 2/1998 | Schecter | 366/176.1 X |

FOREIGN PATENT DOCUMENTS

| | | | |
|---|---|---|---|
| 0322022A1 | 6/1989 | European Pat. Off. | H04N 3/12 |
| 0489211A1 | 6/1992 | European Pat. Off. | B01J 14/00 |
| 0499110A2 | 8/1992 | European Pat. Off. | H03K 17/693 |
| 0499110A3 | 8/1992 | European Pat. Off. | H03K 17/693 |
| 2203870 | 5/1974 | France | C10G 15/00 |
| 1212970 | 3/1966 | Germany . | |
| 1667196 | 6/1971 | Germany . | |
| 1569518 | 6/1980 | United Kingdom | C08F 10/02 |
| 2063695 | 6/1981 | United Kingdom | 366/176.1 |

*Primary Examiner*—Richard D. Lovering
*Attorney, Agent, or Firm*—Emerson & Associates; Roger D. Emerson; Timothy D. Benneth

[57] ABSTRACT

A method of and an apparatus for producing ultra-thin emulsions and dispersions is disclosed. The method includes the steps of passing a hydrodynamic liquid flow containing dispersed components through a flow-through channel having at least one nozzle and a buffer channel and directing a primary liquid jet from the nozzle into the buffer channel, thereby creating a secondary liquid jet in the buffer channel directed toward the nozzle. The primary liquid jet and the secondary liquid jet create a high intensity vortex contact layer that creates collapsing cavitation caverns and cavitation bubbles in the high intensity vortex contact layer. Ultra-thin emulsions and dispersions are formed under the influence of the collapsing cavitation caverns and cavitation bubbles. The apparatus includes a flow-through channel having an inlet and an outlet and a nozzle located inside the flow-through channel between the inlet and the outlet and having an orifice. A primary liquid jet is created as the hydrodynamic liquid flow passes through the orifice of the nozzle. The apparatus also includes a buffer channel located in a wall of the flow-through channel opposite of the orifice of the nozzle such that the primary liquid jet is directed into the buffer channel.

2 Claims, 5 Drawing Sheets

METHOD AND APPARATUS FOR PRODUCING ULTRA-THIN EMULSIONS AND DISPERSIONS

BACKGROUND OF THE INVENTION

1. Field of Invention

The presented invention relates to the method of producing ultra-thin emulsions and dispersions in liquid media with the aid of hydrodynamic cavitation. This method may find application in chemistry, food, pharmaceuticals, and cosmetics processing and other branches of industry.

2. Description of the Related Art

At the present time, there are many known methods for producing emulsions and dispersions. Valve homogenizers are used in the majority of cases for producing finer emulsions. Typical standard valve homogenizers are disclosed in U.S. Pat. Nos. 2,242,809; 2,504,678; 2,882,025; and 4,081,863. In these devices,the hydrodynamic liquid flow passes through orifices between the valve and the seat, where high shear forces are achieved that disperse the emulsion drops. Insofar as the high shear forces are created with the aid of turbulence in these devices, the production of ultra-thin emulsions and dispersions is difficult in that it requires a very high energy consumption. More preferable for producing ultra-thin emulsions is using the effect of collapsing cavitation bubbles. There is known means for producing emulsions and dispersions in which the emulsification and dispersion processes occur as a result of the influence of cavitation created in the course of the processed hydrodynamic flow as a result of a change in the geometric stream. For example, in the homogenizer according to U.S. Pat. No. 3,937,445, a venturi tube is used to create hydrodynamic cavitation.

Also known is a method for obtaining a free disperse system and device for effecting same according to U.S. Pat. No. 5,492,654, in which hydrodynamic cavitation is created due to the positioning of a baffle body in the flow. However, the known methods for producing emulsions and dispersions with the aid of hydrodynamic cavitation have not been sufficiently effective. This is associated with the situation that cavitation is created in the large volume of the flow-through chamber of the device downstream of the local constriction of the flow. Therefore, the cavitation bubbles are distributed in the large volume, at great distances from each other, and consequently, their relative concentration in the processed medium volume is low. During the collapse of the cavitation bubbles, it is not possible to achieve a super high level of energy dissipation which allows for the production of submicron emulsions and dispersions.

The presented invention involving the method of and apparatus for producing ultra-thin emulsions and dispersions allows for the production of high concentration fields of collapsing cavitation bubbles in very small volumes through the hydrodynamic course. A super high level of energy dissipation is generated in these volumes that allows for the production of submicron emulsions and dispersions.

The present invention contemplates a new and improved method of and apparatus for producing ultra-thin emulsions and dispersions which is simple in design, effective in use, and overcomes the foregoing difficulties and others while providing better and more advantageous overall results.

SUMMARY OF THE INVENTION

In accordance with the present invention, a new and improved method of and apparatus for producing ultra-thin emulsions and dispersions is provided which allows for the production of submicron emulsions and dispersions.

The objective of the presented invention is to introduce a method of producing ultra-thin emulsions and dispersions, which in accordance with the invention is comprised of the passage of a hydrodynamic liquid flow containing dispersed components through a flow-through channel internally having at least one nozzle. Located after the nozzle and along the stream is a buffer channel which is directed by its open end in the nozzle side. Inside the nozzle, a high velocity primary liquid jet, which enters into the buffer channel at a minimal distance from the nozzle. In the buffer channel, flowing out from this channel, a secondary liquid jet is formed, which moves in the buffer channel towards the primary jet and forms with the surface of the primary jet a high intensity vortex contact layer. In the high intensity vortex contact layer, collapsing cavitation caverns and bubbles are generated which disperse emulsions and dispersions to submicron sizes.

The method, in accordance with the invention, is comprised in that, a cylindrical or flat shaped primary liquid jet is formed in the nozzle having a velocity at the outlet from the nozzle of at least 50 m/sec, and which enters the buffer channel. The buffer channel functions in the wall perpendicularly positioned to the direction of the moving primary liquid jet at a distance from the nozzle equal to three or more diameters or thicknesses of the primary jet.

Moreover, the buffer channel is created in order that the ratio of the cross-sectional area of the channel to the cross-sectional area of the primary jet is at least 1.05, and the depth of the buffer channel constitutes at least one diameter or thickness (for a flat jet) of the primary fluid jet. The selected dimension limits of the buffer channel ensure the formation of a stable secondary liquid jet and allow for the support of controlled cavitation regimes in the vortex contact layer, thereby providing for the high effectiveness of dispersing emulsions and dispersions. The primary liquid jet may be introduced into the buffer channel either along its centerline or near the buffer channel wall.

Another objective of the present invention is the formation of two or more high velocity liquid jets in the nozzle. These jets are introduced either into the same buffer channel, or each of the jets is introduced into a separate buffer channel. Formation of two or more high velocity primary jets in the nozzle allows for the increase of the capacity of the method. The introduction of two or more primary jets into one buffer channel increases the concentration of cavitation bubbles in the buffer channel that improves the degree of dispersing the processed components.

In accordance with another aspect of the present invention, the bottom of the buffer channel may be flat, conical, or spherical The shape renders an influence on the hydrodynamics of the secondary jet and, accordingly, on the structure of the collapsing bubbles field. In some cases, the processed liquid volume expediently passes through the nozzle and buffer channel repeatedly for producing a rather narrow distribution of dispersed particle sizes.

The present invention allows for the production of submicron emulsions and dispersions as a result of the use of a super high level of energy dissipation during the collapsing of a great number of cavitation bubbles in very small volumes. The volume in which the energy is released is fixed and equal to the volume of the buffer channel. Given the dimensions of the buffer channel, it is possible to control the level of energy dissipation and produce ultra-thin emulsions and dispersions of the required particle size.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
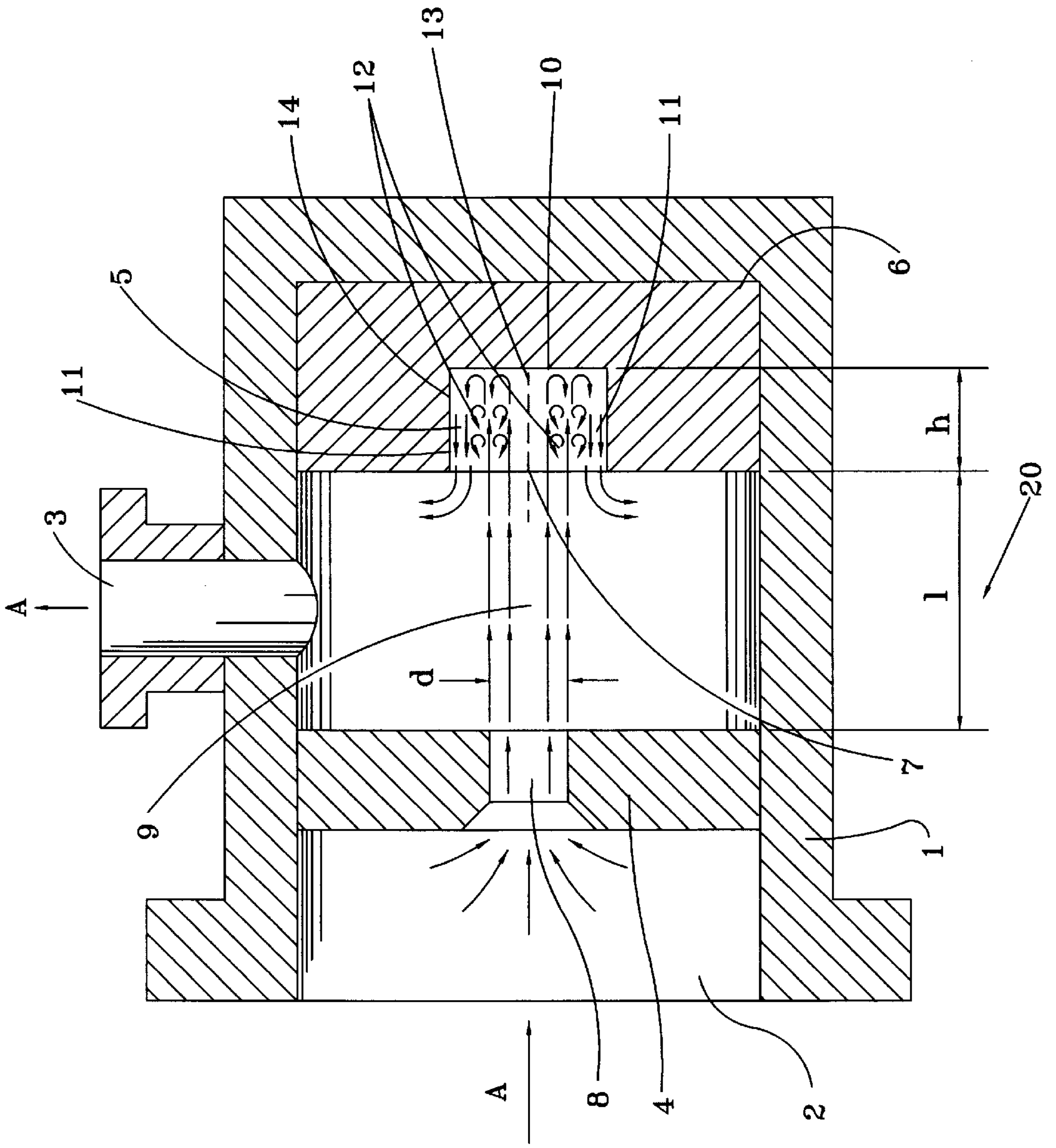
FIG. 1 is a schematic illustration of the process and apparatus according to the present invention.
Figure 5:
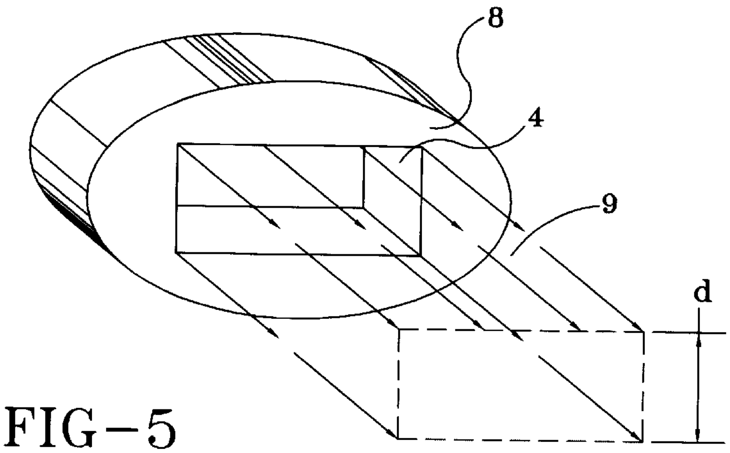
FIG. 5 shows a schematic illustration of a nozzle with a polygonal shaped orifice and a flat primary liquid jet; and, FIG. 6 shows an alternate embodiment of a nozzle and orifice where the orifice is a slit cut into the side of the nozzle that redirects the hydrodynamic liquid flow by 90°.

Referring now to the drawings wherein the showings are for purposes of illustrating a preferred embodiment of the invention only and not for purposes of limiting the same, FIG. 1 shows a longitudinal view of apparatus 20, containing flow-through channel 1 having inlet 2 and outlet 3. Inside of flow-through channel 1 consecutively located along the flow stream is nozzle 4 and buffer channel 5. Buffer channel 5 functions in wall 6, which is positioned perpendicularly into the direction of the movement of a primary fluid jet 9 from nozzle 4. Buffer channel 5 is directed by its orifice 7 in the direction of nozzle 4. The distance 1 from nozzle 4 to the orifice 7 of buffer channel 5 is maintained by the condition that $1 \geqq 3d$, where d is the diameter of the outflow from nozzle 4 of the cylindrical primary liquid jet 9. If a flat primary liquid jet 9 is formed in the nozzle 4, as shown in FIG. 5, then the magnitude of d is equal to its thickness with the magnitude of d connected also with the dimensions of buffer channel 5. The depth h of the buffer channel 5 is selected such that $h \geqq d$. The ratio of the cross-sectional area of buffer channel 5 to the cross-sectional area of primary liquid jet 9 must be at least 1.05.

The hydrodynamic liquid flow moves along the direction indicated by arrow A through the inlet 2 and flows into flow-through channel 1. Further, the flow passes through orifice 8 of nozzle 4, where a high velocity primary liquid jet 9 is formed having the characteristic dimension d. For a cylindrical primary liquid jet 9, d is the diameter, and for a flat primary liquid jet 9, d is the thickness. The velocity of primary liquid jet 9 at the outlet from orifice 8 of nozzle 4 is 50 m/sec or greater. Primary liquid jet 9 flows into buffer channel 5, where colliding with the bottom 10 of buffer channel 5, the primary liquid jet 9 flow initially decelerates and then changes direction of movement to the opposite. The flow flows out from buffer channel 5 as a secondary liquid jet 11, which moves inside buffer channel 5 towards primary liquid jet 9.

In the contact zone of primary jet 9 and secondary jet 11, a high intensity vortex contact layer 12 is created. This is promoted by high velocity flow of primary jet 9, greater than 50 m/sec, and also the restricted dimensions of buffer channel 5. The buffer channel depth h is selected such that $h \geqq d$, and the ratio of the crosssectional area of buffer channel 5 to the cross-sectional area of primary jet 9 is at least 1.05.

Cavitation caverns and bubbles are created in the high intensity vortex contact layer 12. During the collapse of cavitation caverns and bubbles, high localized pressures, up to 1000Mpa, arise, turning out intensive dispersing influence on the volume of processed components located in the buffer channel 5. The level of energy dissipation in the cavitation dispersing zone attains a magnitude in the range of $1^{10}$–$1^{15}$ watt/kg, thereby allowing the production of very finely dispersed emulsions and dispersions. In most cases, the particle sizes of emulsions are found at the submicron level. After passage through the collapsing bubbles zone, the flow of processed components is drawn out from flow-through channel 1 through outlet 3.

Primary liquid jet 9 may be introduced into buffer channel 5 along its centerline 13 as well as asymmetrically, closer to the wall 14. The cross-sectional shape of buffer channel 5 does not influence the effectiveness of the process. However, from the standpoint of the technological fabrication of the apparatus for realization of the presented method, it is preferable to make buffer channel 5 with a cross-sectional shape of a disk or rectangle.

Figure 2:
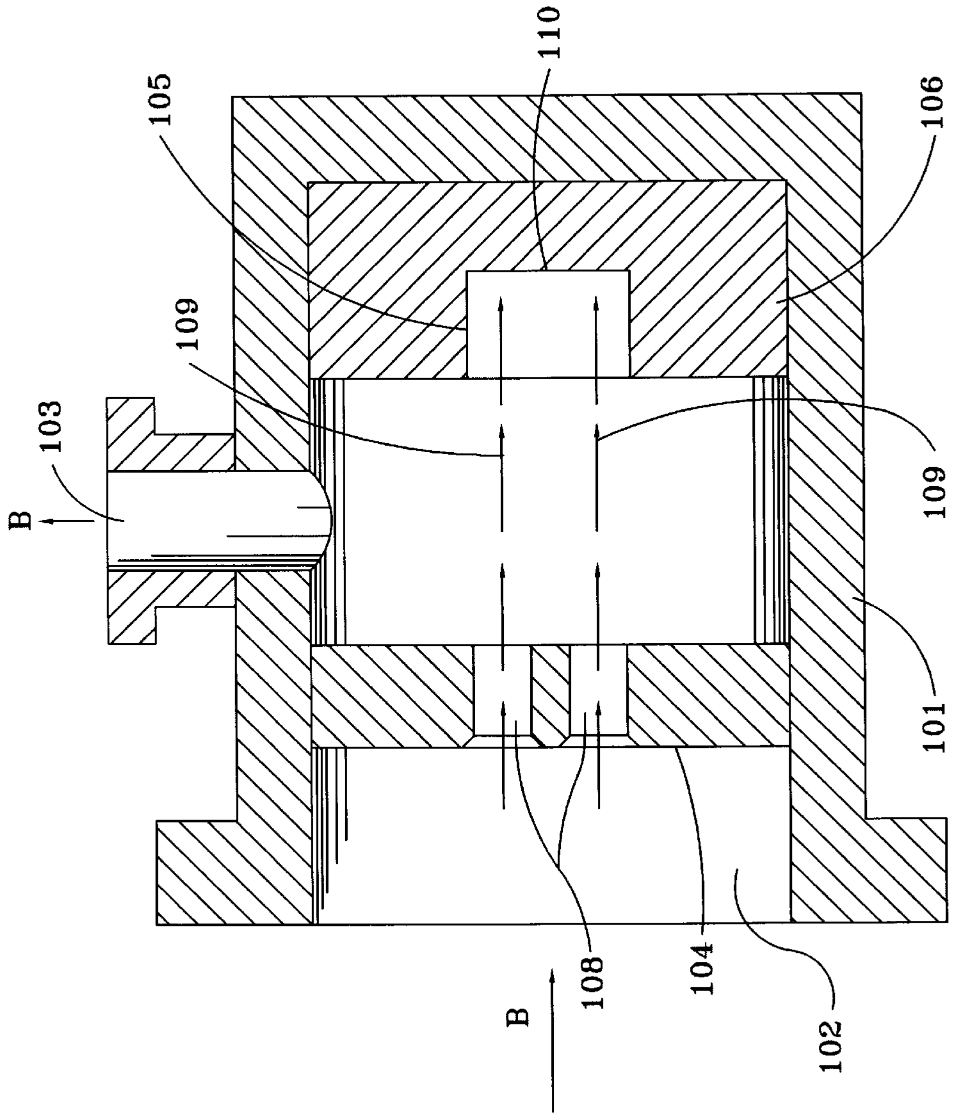
FIG. 2 is a longitudinal section of the apparatus for inplementation of a method containing a nozzel in which two primary liquid jets are formed which are introduced into the same buffer channel.

FIG. 2 presents an alternative apparatus design intended for accomplishment of the process.

FIG. 2 shows a longitudinal view of apparatus 20, containing flow through channel 101, having inlet 102 and outlet 103.

In the presented apparatus, inside the flow-through channel 101, nozzle 104 is positioned, having two orifices 108 and wall 106 in which there is buffer channel 105. The hydrodynamic liquid flow moves along the direction indicated by arrow B, through the inlet 102 and flows into flow-through channel 101. Further, the flow passes through orifices 108 of nozzle 104, where two high velocity primary liquid jets 109 are formed, which flow into one buffer channel 105. Several high intensity contact layers are created containing collapsing cavitation bubbles. For this design, the cross-sectional area of the buffer channel is selected in such a manner that the ratio of the total cross-sectional area of all the primary jets 109 entering the buffer channel 105 to the cross-sectional area of the buffer channel 105 is at least 1.05.

It is possible to form two jets 109 in the nozzle 104, each of which will enter into one buffer channel 105. This alternate design is shown in FIG. 3, with arrow C representing the flow of hydrodynamic fluid through the flow-through channel 101.

Figure 3:
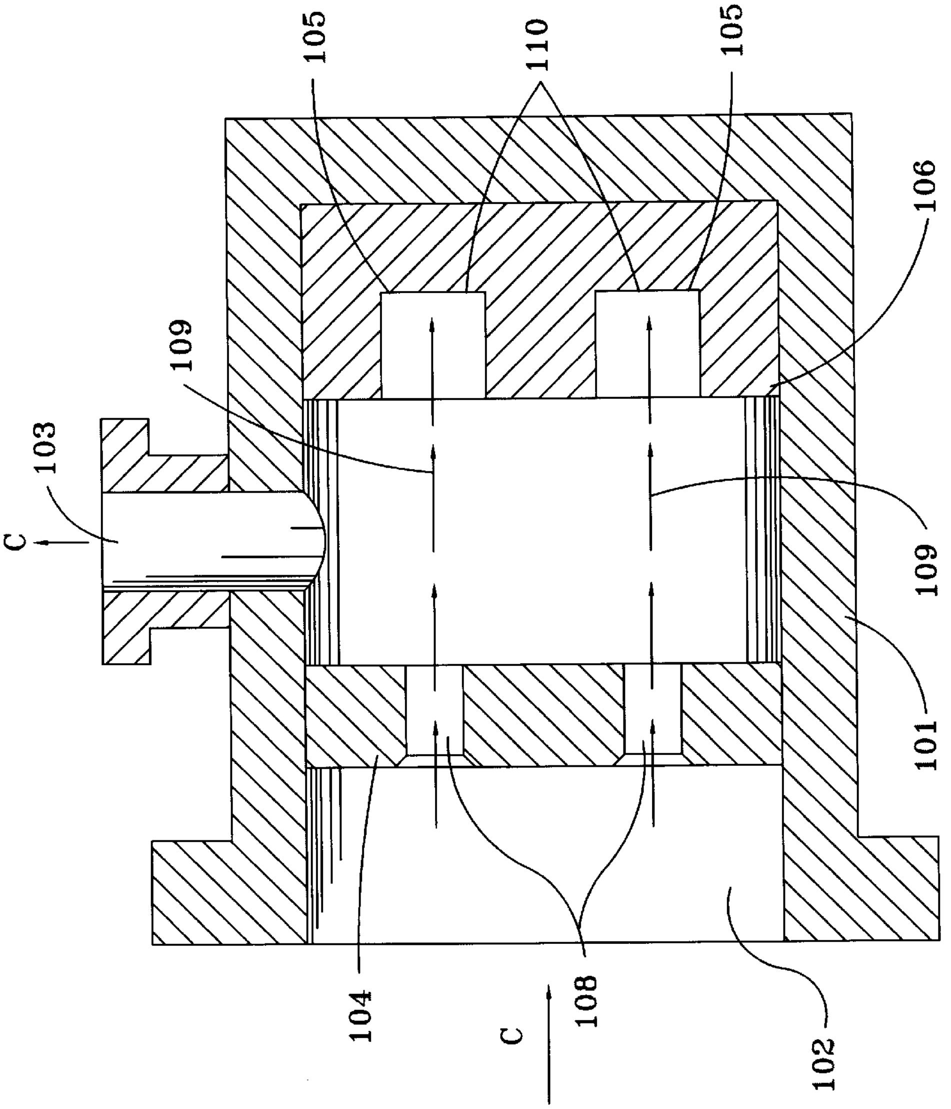
FIG. 3 is a longitudinal section of the apparature for implementation of a method containing a nozzle in which two primary liquid jets are formed, each of which is introduced into a separate buffer channel.
Figure 4B:
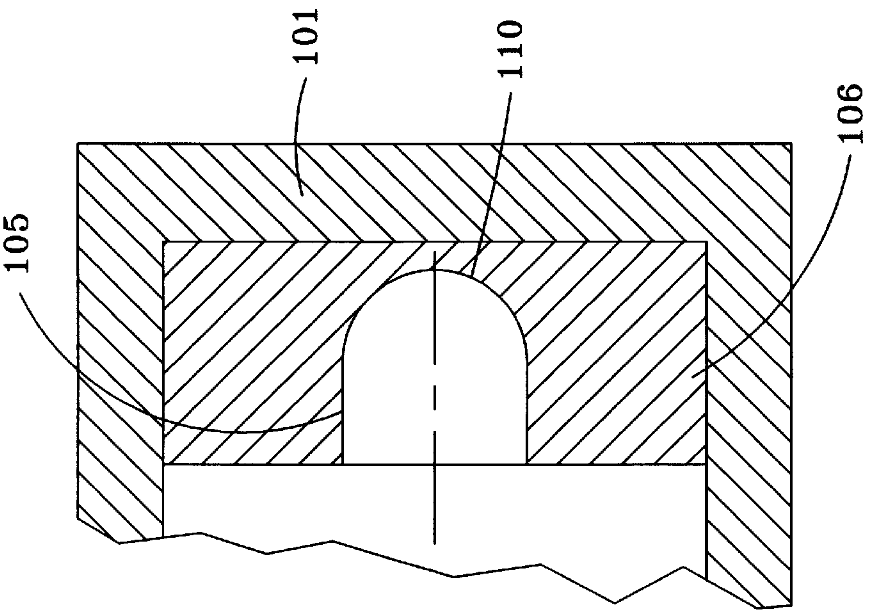
FIGS. 4A and 4B are fragmented views of the longitudinal section of the buffer channel in the apparatus according to FIG. 1 in which the bottom is made conically and spherically respectively.
Figure 4A:
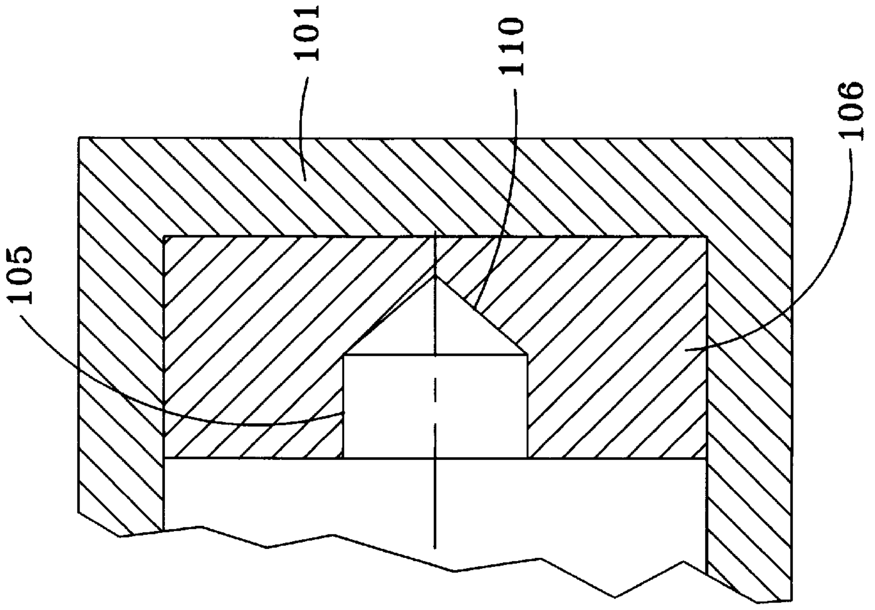

The bottoms 10,110 of the buffer channels 5,105, shown in FIGS. 1, 2, and 3 is made flat. However, the bottom 110 of buffer channel 105 in wall 106 of the flow-through channel 101 may have a conical shape as shown in FIG. 4A or a semi-spherical shape as shown in FIG. 4B.

The flow of processed components is fed into the apparatus 20 with the aid of an auxiliary pump (not shown). The processed components may be fed through the apparatus 20 repeatedly.

Figure 6:
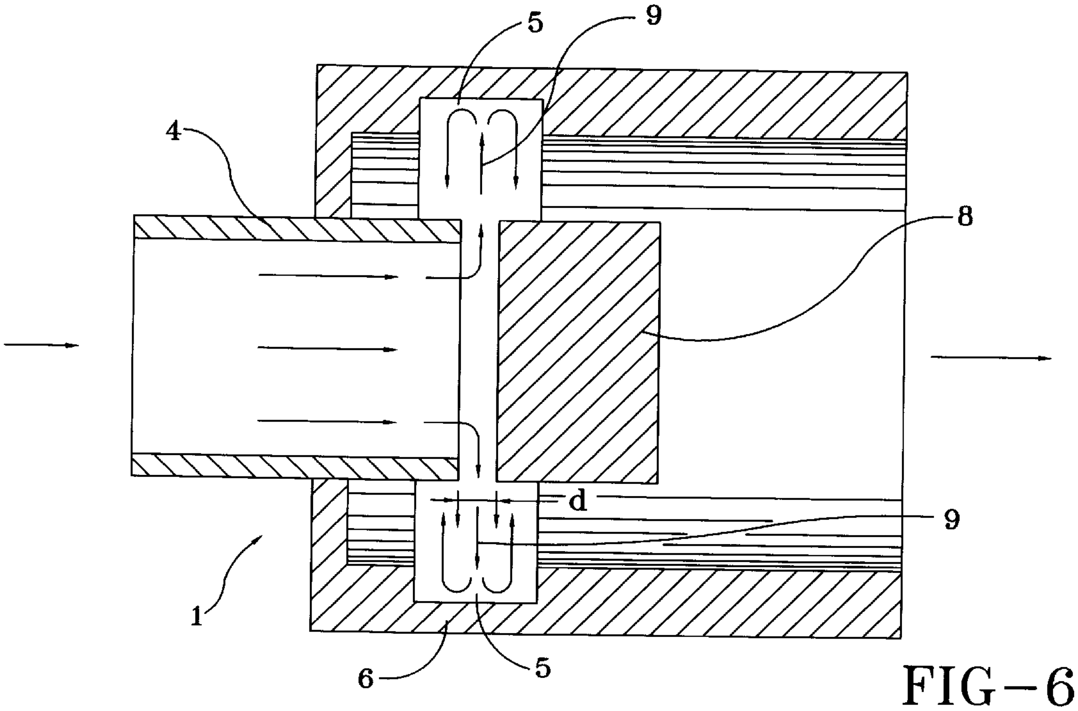

FIG. 6 shows an alternate embodiment of the apparatus 20 where the orifice 8 is a slit cut into the side of the nozzle 4. The hydrodynamic liquid flow, represented by the arrows, is redirected by approximately 90°, and the primary liquid jet 9 is substantially perpendicular to the hydrodynamic liquid flow. The primary liquid jet 9 is then directed into buffer channels 5 located in the wall 6 of the flow through channel 1.

Several practical examples of the accomplishment of the method with the aid of the apparatus 20 as shown in FIG. 1 are described below. In this apparatus 20, the dimensions of the buffer channel 5 were a depth h equal to three diameters d of the primary liquid jet 9 and the ratio of the cross-sectional area of the buffer channel 5 to the cross-sectional area of the primary liquid jet 9 was 4.20.

EXAMPLE 1

2% by volume corn oil was mixed with 98% distilled water within a 30 second period without the addition of surfactants. A coarsely-dispersed emulsion resulted with the droplet sizes being more than 300 microns. This emulsion was fed into the apparatus 20 shown in FIG. 1. The velocity of the primary liquid jet 9 was 58 m/sec. After one pass through the apparatus 20, the resulting droplet size of the emulsion was 0.91 microns.

EXAMPLE 2

Prepared in the same manner as Example 1 above, a 2% emulsion of corn oil in distilled water was fed into the apparatus 20 shown in FIG. 1. The velocity of the primary liquid jet 9 was 165 m/sec. After one pass through the apparatus 20, the resulting droplet size of the emulsion was 0.68 microns. After three passes through the apparatus 20, the droplet size of the emulsion was reduced to 0.47 microns.

EXAMPLE 3

15% by weight ultramarine pigment was mixed with 85% distilled water. The initial particle size of the produced suspension was 6.23 microns. This suspension was fed into the apparatus 20 shown in FIG. 1. The velocity of the primary liquid jet 9 was 142 m/sec. After one pass through the apparatus 20, the particle size of the pigment was 0.74 microns.

The preferred embodiments have been described hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A method of producing ultra-thin emulsions and dispersions comprising the steps of:

passing a hydrodynamic liquid flow containing dispersed components through a flow-through channel having at least one nozzle and a buffer channel;

directing a primary liquid jet from said nozzle into said buffer channel, thereby creating a secondary liquid jet in said buffer channel directed toward said nozzle, said primary liquid jet and said secondary liquid jet creating a high intensity vortex contact layer;

creating collapsing cavitation caverns and cavitation bubbles in said high intensity vortex contact layer;

forming ultra-thin emulsions and dispersions under the influence of collapsing cavitation caverns and cavitation bubbles;

passing for a second time said hydrodynamic liquid flow containing dispersed components through said flow-through channel having said least one nozzle and said buffer channel;

directing for a second time said primary liquid jet from said nozzle into said buffer channel, thereby creating a secondary liquid jet in said buffer channel directed toward said nozzle, said primary liquid jet and said secondary liquid jet creating a high intensity vortex contact layer;

creating for a second time collapsing cavitation caverns and cavitation bubbles in said high intensity vortex contact layer; and, forming further processed ultra-thin emulsions and dispersions under the influence of collapsing cavitation caverns and cavitation bubbles, whereby said material obtains further processing.

2. The method of claim 1 further comprising the step of: repeating said method a plurality of times.

* * * * *